(12) United States Patent
Sagdic et al.

(10) Patent No.: US 8,656,661 B2
(45) Date of Patent: Feb. 25, 2014

(54) CONNECTION DEVICE FOR PHOTOVOLTAIC MODULES AND METHOD FOR INSTALLING SAME

(75) Inventors: Mehmet Sagdic, Detmold (DE); Stefan Giefers, Detmold (DE); Udo Hoppe, Blomberg (DE); Thomas Beier, Schloss Hilte-Stukenbrock (DE)

(73) Assignee: Phoenix Contact GmbH & Co. KG (DE)

( * ) Notice: Subject to any disclaimer, the term of this patent is extended or adjusted under 35 U.S.C. 154(b) by 0 days.

(21) Appl. No.: 13/703,064

(22) PCT Filed: May 19, 2011

(86) PCT No.: PCT/EP2011/002494
§ 371 (c)(1),
(2), (4) Date: Dec. 10, 2012

(87) PCT Pub. No.: WO2011/157340
PCT Pub. Date: Dec. 22, 2011

(65) Prior Publication Data
US 2013/0081338 A1    Apr. 4, 2013

(30) Foreign Application Priority Data
Jun. 18, 2010 (DE) .......................... 10 2010 024 350

(51) Int. Cl.
*E04D 13/18* (2006.01)
*E04C 2/52* (2006.01)
(52) U.S. Cl.
USPC .......... 52/173.3; 219/523; 219/522; 136/244; 359/265; 52/204.593

(58) Field of Classification Search
USPC ............ 52/745.19, 204.591, 204.593, 173.3; 439/259, 260, 271, 278, 595, 594; 359/265; 136/251, 244; 126/623, 621, 126/622; 219/520, 521, 522, 523, 121.59, 219/550
See application file for complete search history.

(56) References Cited

U.S. PATENT DOCUMENTS 4,329,009 A * 5/1982 Bungo ........................... 439/866
4,663,495 A * 5/1987 Berman et al. ................ 136/248
(Continued)

FOREIGN PATENT DOCUMENTS

| EP | 2146383 A1 | 1/2010 |
|---|---|---|
| FR | 2850488 A1 | 7/2004 |
| WO | 2008148524 A2 | 12/2008 |

OTHER PUBLICATIONS

Agnes Wittmann-Regis, "International Patent Application No. PCT/EP2011/002494 International Preliminary Report on Patentability", Jan. 17, 2013, Publisher: PCT, Published in: EP.

(Continued)

*Primary Examiner* — Joshua J Michener
*Assistant Examiner* — Chi Q Nguyen
(74) *Attorney, Agent, or Firm* — Kaplan, Breyer, Schwarz & Ottesen, LLP

(57) ABSTRACT

A connecting device for photovoltaic-capable insulating glass comprises at least one retaining device laterally attached to the photovoltaic-capable insulating glass. In its installed state, the retaining device is open on at least one side which faces the intermediate space so that at least one ribbon is insertable into a clamping device inserted in the retaining device, and wherein the ribbon establishes an electrical contact for a photovoltaic device accommodated in the at least one intermediate space, and wherein the clamping device is provided with an electrical supply line such that the clamping device establishes an electrical clamping contact between the at least one ribbon and the electrical supply line.

13 Claims, 5 Drawing Sheets

(56) References Cited

U.S. PATENT DOCUMENTS

| | | | |
|---|---|---|---|
| 5,852,284 A * | 12/1998 | Teder et al. | 219/522 |
| 6,051,820 A * | 4/2000 | Poix et al. | 219/522 |
| 6,144,017 A * | 11/2000 | Millett et al. | 219/522 |
| 7,002,115 B2 * | 2/2006 | Gerhardinger et al. | 219/543 |
| 7,053,343 B2 * | 5/2006 | Gerhardinger et al. | 219/543 |
| 7,241,964 B2 * | 7/2007 | Gerhardinger et al. | 219/121.59 |
| 7,265,323 B2 * | 9/2007 | Gerhardinger et al. | 219/543 |
| 7,592,537 B1 * | 9/2009 | West | 136/251 |
| 2001/0050102 A1 * | 12/2001 | Matsumi et al. | 136/244 |
| 2005/0000562 A1 | 1/2005 | Kataoka | |

OTHER PUBLICATIONS

Peggy Wills, "International Patent Application No. PCT/EP2011/002494 International Preliminary Report on Patentability", Oct. 31, 2012, Publisher: PCT, Published in: EP.

Jean-Pierre Stirn, "International Patent Application No. PCT/EP2011/002494", Nov. 7, 2011, Publisher: PCT, Published in: EP.

* cited by examiner

CONNECTION DEVICE FOR PHOTOVOLTAIC MODULES AND METHOD FOR INSTALLING SAME

FIELD OF THE INVENTION

The invention generally relates to a connecting device for contacting photovoltaic modules. In particular, the invention relates to a connecting device for contacting photovoltaic-capable insulating glass.

In addition, the invention also relates to a method for mounting the connecting device to the photovoltaic-capable insulating glass.

BACKGROUND OF THE INVENTION

Photovoltaic systems are increasingly used to produce electricity from sunlight. Beside wind power, a very high economic importance is especially attached to photovoltaics, since it provides a still largely untapped potential. For example it is readily possible to feed the generated but not requested current into the electricity grid or to charge batteries for later use.

Unlike wind power stations, photovoltaic systems are lightweight, compact, easy to handle, and virtually maintenance-free. They can be configured much more flexible than wind power stations and thus offer themselves as a flexible and inexpensive isolated solution. So far, photovoltaic modules were mainly placed on roofs or in the open at suitable areas. However, not all potential users have available such a roof or suitable area. Also, the ratio of roof surface to living surface may be low, so that only a small power collecting surface is facing a high demand of electricity.

Although the photovoltaic modules could be attached to building facades, this is sometimes not desirable since the photovoltaic modules might have a negative effect on the appearance of the building, for aesthetic reasons. Additionally, the front facade is usually dominated by windows. A large portion of the useful light gathering or power collecting surface therefore remains unexploited.

A solution to this problem is provided by the use of transparent photovoltaic modules. Not only may such modules be attached visually neutral on or to facades, but may even be attached to or accommodated between window glass panes, especially in the space between double-walled insulating glass. These photovoltaic modules now do no longer disturb the outer appearance of the building, as they are largely transparent. Especially in glazed buildings with many floors this presents a huge economic and energetic potential. Besides, such modules do not only generate electricity, but also serve as a sunscreen, privacy screen, and/or anti-glare screen.

Usually, conventional photovoltaic modules are connected and wired on their rear face using a junction box. Patent application DE 10 2008 022 297 A1 describes such a junction box for solar modules and methods for mounting it to the modules. According to this document, with the box mounted, the flat-ribbon cables emanating from the photovoltaic module are pressed into grooves provided therefor, the cables establishing an electrical contact with connectors which are attached to the housing, via contact terminals. The electrical connection between the flat-ribbon conductors and the contact terminals is produced either by means of contact clamps, or by soldering or welding.

Patent application DE 10 2007 006 433 A1 describes a junction box for electrically connecting a solar module and a method for mounting a junction box to a solar panel. The two-part junction box is connected to a contact clamp at the rear face of the photovoltaic substrate by means of a ribbon cable which establishes an electrical contact to the photovoltaic module. This ribbon is threaded into the lower housing part. When the upper housing part is placed onto the lower housing part, suitable guide elements in the interior of the housing establish a contact between the ribbon cable and an electrical connector which protrudes from the junction box.

In case of insulating glass, especially those having a transparent semiconductor film, for example for facades, such wiring is not suitable or desirable, since such a box would have to be attached to each insulating glass pane. The contacting of the panes and the wiring between the modules would be implemented within the facade framework in order not to impair the view through the insulating glass. Also, the photovoltaic module is arranged between the insulating glass panes. Therefore, the electrical contacting of the photovoltaic module would have to be passed to the outside in complex manner, to protect the interior of the insulating glass from moisture. This requires additional components and/or increased assembly costs.

Therefore, contacting of an insulating glass on a lateral side thereof would be desirable.

SUMMARY OF THE INVENTION

So far, appropriate connection means for such contacting of photovoltaic-capable insulating glass are still lacking.

Therefore an object of the invention is to provide a connecting device for photovoltaic-capable insulating glass, which does not have the above-mentioned drawbacks and which is easily installed while providing a maximum of flexibility.

Accordingly, the invention provides a connecting device for photovoltaic-capable insulating glass, comprising at least one retaining device laterally attached to the photovoltaic-capable insulating glass. The retaining device is open on the side which in the installed state of the retaining device faces the intermediate space, so that at least one ribbon is insertable into a clamping device inserted in the retaining device. The at least one ribbon establishes an electrical contact for a photovoltaic device accommodated in the at least one intermediate space.

The clamping device is provided with an electrical supply line in such a way that the clamping device establishes an electrical clamping contact between the at least one ribbon and the electrical supply line.

A ribbon refers to a flat-ribbon conductor which protrudes from a PV module and establishes the electrical connection between the internal cells of the module and the junction box. It may either be rigid or flexible.

In a preferred embodiment, the width of the retaining device of the connecting device can be adapted to the width of the at least one intermediate space between the at least two insulating glass panes by means of severable elements. This is particularly advantageous, since insulating glass is made in different thicknesses. If the retaining device is designed to be variable, this allows for later adjustment to the ultimately selected insulating glass.

Furthermore, advantageously, the retaining device of the connecting device has a collar engaged in the intermediate space of the insulating glass, the width of the collar being adaptable to the width of the intermediate space.

In a particularly preferred embodiment of the connecting device, the electrical connecting device is formed by a clamp spring. Thus, by simply applying a force, a robust connection can be established between the electrical supply line and the at least one ribbon. Additional equipment such as soldering means are not required for establishing the contact.

In a particularly preferred embodiment, the retaining device of the connecting device is adapted to accommodate a sealing compound. This allows to protect the interior of the insulating glass from moisture. Additionally, this ensures electrical insulation of the contact clamps from the environment, for example in case of metal window frames or facade elements.

In an most preferred embodiment of the connecting device, the retaining device has at least one of the following properties:

- the retaining device is attached or can be attached on and/or to the at least one edge of the at least two insulating glass panes;
- the retaining device has at least one support for at least one clamping device, in order to reduce or prevent the risk of tearing off the flat-ribbon cable;
- the retaining device allows to support and/or guide the electrical supply line so that the cable cannot get into the transparent area of the window;
- the retaining device allows the ribbon to be passed through the retaining device or through the retaining device and the clamping device, so allowing for an easy and uncomplicated assembly of the connecting device.

In a particularly preferred embodiment, the photovoltaic-capable insulating glass comprises at least one ribbon protruding from the intermediate space between the at least two insulating glass panes, and at least one connecting device mounted to the photovoltaic-capable insulating glass. By utilizing several ribbons, the internal wiring complexity can be reduced. In case of large window areas, this is particularly advantageous since current may be tapped at different points.

It is particularly advantageous if the at least one ribbon protrudes from the at least one intermediate space between the at least two insulating glass panes. In this case, the contacts can be established outside the insulating glass and the ribbon is more easily accessible. Also, the area on which the retaining device protrudes into the viewing area of the window can be minimized in this way. In other words, the connection is made within the window frame.

The method according to the invention for connecting such a connecting device to a photovoltaic-capable insulating glass comprises the steps of:

- providing a photovoltaic-capable insulating glass with at least one ribbon, that establishes electrical contact with the photovoltaic module;
- connecting at least one electrical supply line or at least one electrical contact terminal with at least one electrical clamping device; in the installed state of the connecting device, the clamping device establishes a conductive connection between the ribbon and the electrical supply line;
- providing a retaining device which accommodates and/or supports the at least one electrical clamping device or the at least one electrical clamping device and the at least one electrical supply line, for establishing a clamping contact with the at least one ribbon, and which has an opening at its bottom side,
- inserting the electrical clamping device into the retaining device;
- mounting the connecting device to the photovoltaic-capable insulating glass, wherein the connecting device is placed over the flexible ribbon and the ribbon is passed through the clamping device;
- applying a force to the clamping device such that the clamping device establishes an electrical contact between the ribbon and the electrical supply line.

The steps herein are not specified in any mandatory order. They may also be performed in a different order or even simultaneously. By way of example, it is also possible to first mount the retaining device to the photovoltaic-capable insulating glass, and only then to introduce the clamping device into the retaining device. Likewise, the connecting device may first be provided, and then the photovoltaic-capable insulating glass. It is also possible to establish the connection of the contact clamp with the electrical supply line only after the clamping contact has been inserted into the retaining device, even if the retaining device had already been attached to the insulating glass.

Particularly preferable in the above described method for connecting a connecting device to a photovoltaic-capable insulating glass, the width of the connecting device is adjusted to the width of the at least one intermediate space between the at least two insulating glass panes by means of the severable strips of the retaining device.

According to a particularly preferred embodiment of the inventive method, the ribbon is cut to a predetermined length. The risk of an unwanted short circuit caused by surrounding metal bodies may thus be reduced or even completely avoided.

According to another preferred embodiment of the inventive method, the ribbon is folded over towards a clamp spring of the clamping device. This measure further reduces the risk of an electrical short circuit.

In an especially preferred embodiment of the method for connecting a connecting device to a photovoltaic-capable insulating glass, the retaining device is closed by a covering element and/or filled with a sealing compound. In this manner, an ingress of humidity into the space between the insulating glass panes and short circuits to surrounding metal parts are effectively prevented.

BRIEF DESCRIPTION OF THE DRAWINGS

The invention will now be described by way of exemplary embodiments and with reference to the accompanying drawings. In the drawings, the same reference numerals refer to the same or similar elements. In the drawings.

DETAILED DESCRIPTION OF THE INVENTION

Figure 1A:
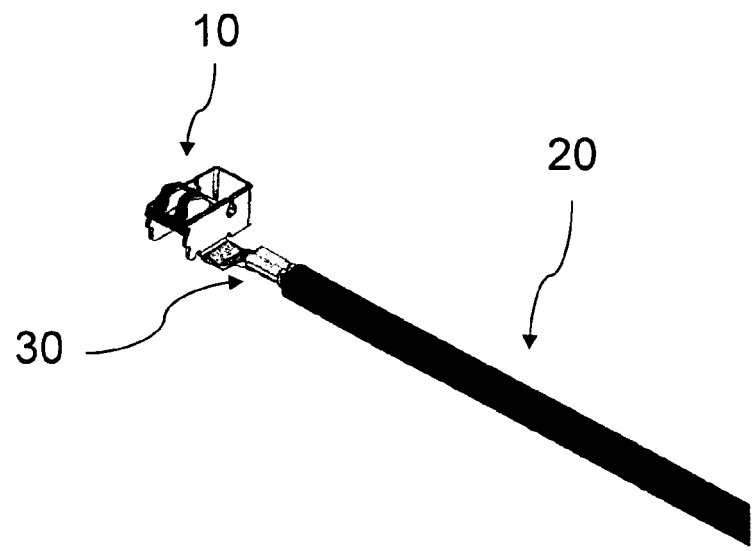
FIG. 1a shows a clamping device (clamp spring) of the connecting device according to the invention together with an electrical supply line.

FIG. 1a shows an exemplary clamping device 10 of the connecting device 1 according to the invention together with an electrical supply line 20. Clamping device 10 is attached to electrical supply line 20 by a crimp connection 30. Supply line 20 leads, for example, to further photovoltaic-capable insulating glass panes and/or to inverters, not illustrated in FIG. 1a.

Figure 1B:
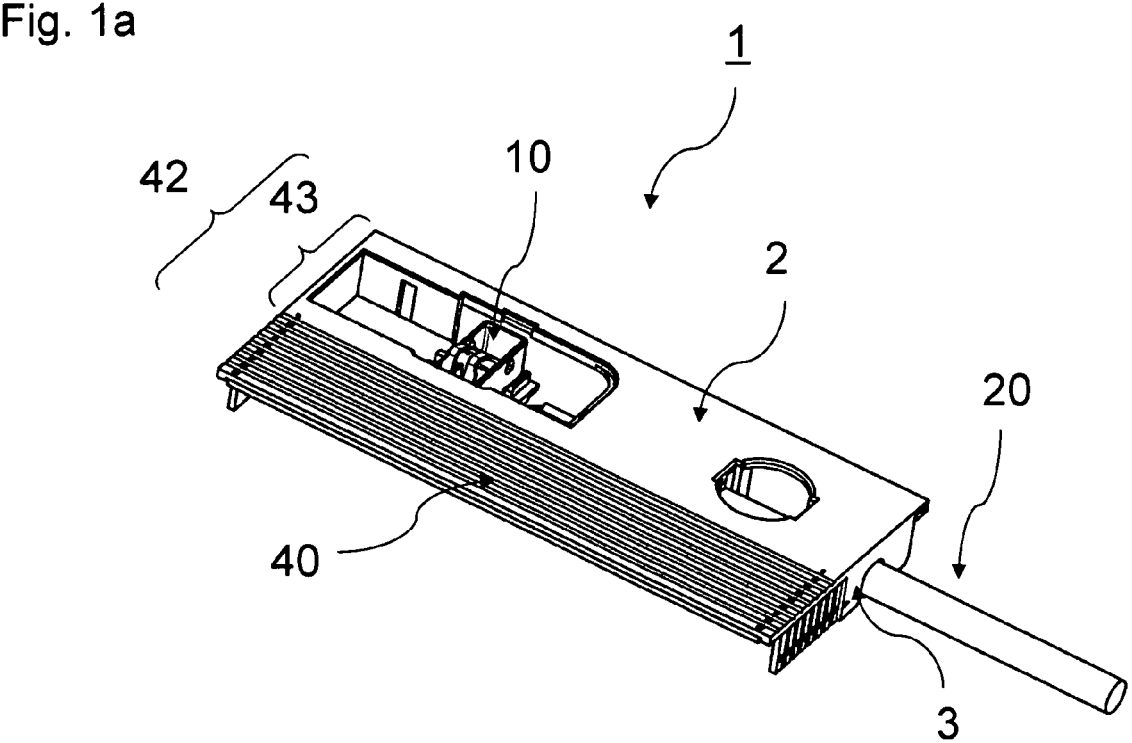
FIG. 1b shows a clamping device (clamp spring) as it is inserted into the retaining device according to the invention.

In FIG. 1b, clamping device 10 is accommodated in the retaining device 2 of connecting device 1 according to the invention. Electrical supply line 20 is guided through a recess 3. The width of retaining device 2 of connecting device 1 may be adjusted to an appropriate width by severable strips 40. Depending on the number of severed strips, a predetermined width may be adjusted between a maximum width 42 and a minimum width 43.

Figure 2A:
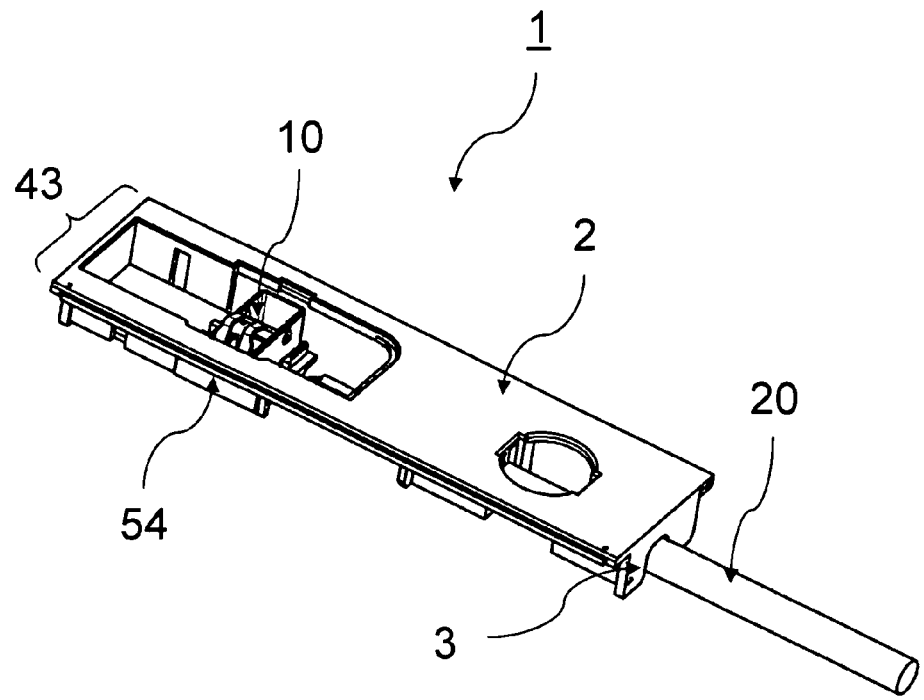
FIG. 2a shows the retaining device as it has been cut to an appropriate size by means of the severable strips.
Figure 2B:
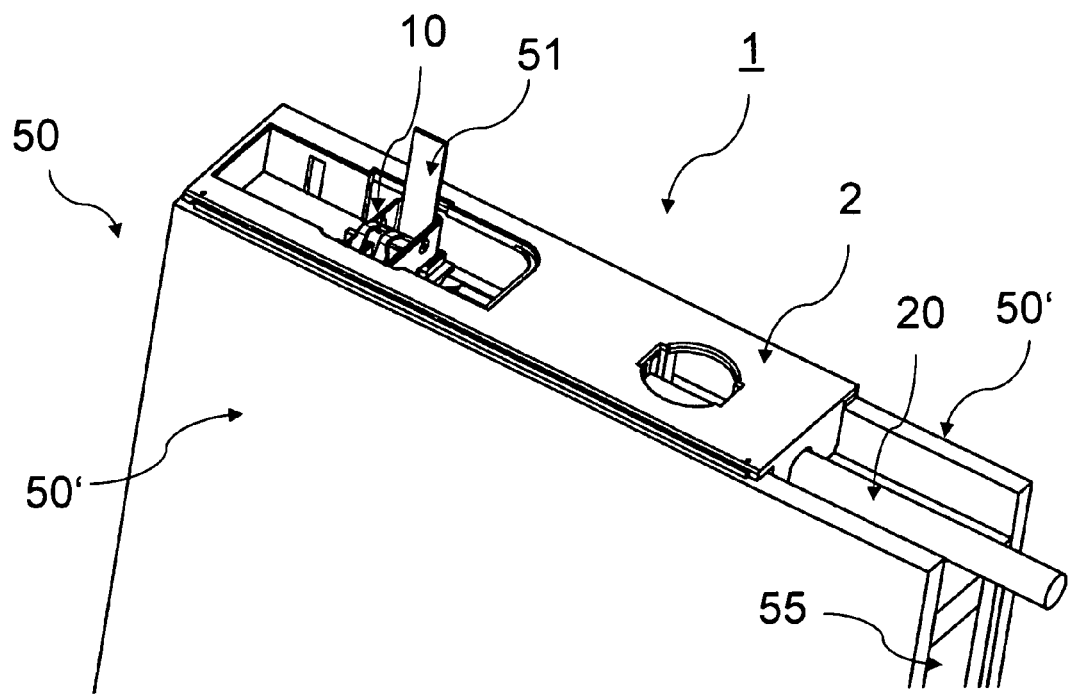
FIG. 2b illustrates how the adjusted retaining device of FIG. 2a is inserted between the insulating glass panes of the photovoltaic-capable insulating glass, with the ribbon passed therethrough.
Figure 3A:
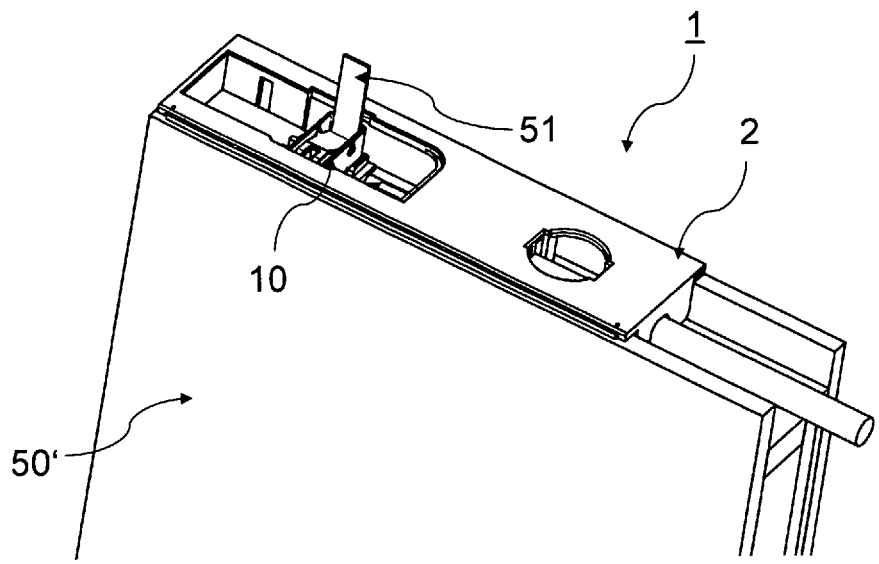
FIG. 3a shows the connecting device with the clamping device (clamp spring) closed and the ribbon protruding.

In FIG. 2a, retaining device 2 of connecting device 1 has been cut to the minimum possible width 43 utilizing severable strips 40, A recess 54 for passing the ribbon is also denoted in FIG. 2a. The retaining device 2 of the connecting device 1 has a collar 3 engaged in the intermediate space 55 of the insulating lass 50. In FIG. 2b, retaining device 2 of this connecting device 1 is shown inserted between the two insulating glass panes 50' of photovoltaic-capable insulating glass 50. Here, the ribbon 51 protruding from photovoltaic-capable insulating glass 50 has already been passed through clamping device 10 and recess 54 of retaining device 2. The clamping device 10 is not closed yet. This is only the case in FIG. 3a.

Figure 3B:
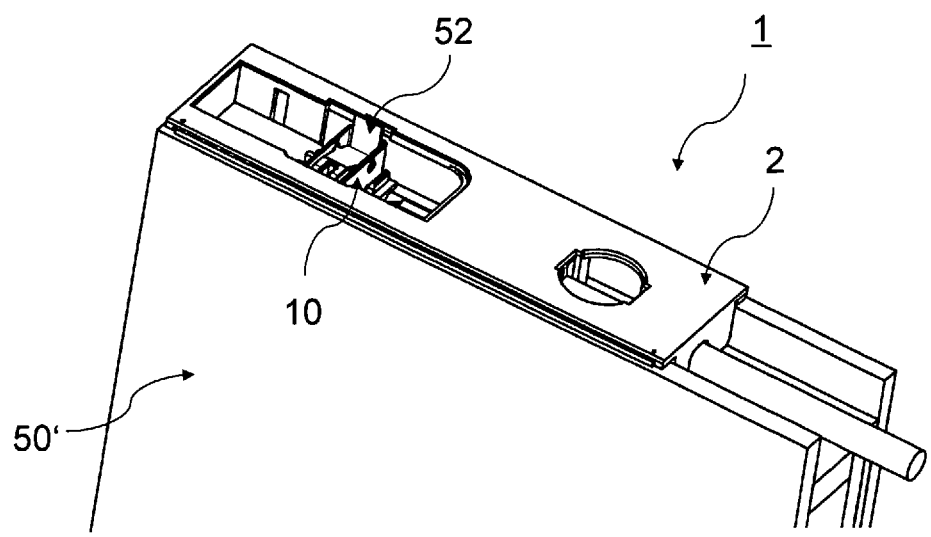
FIG. 3b shows the connecting device with the clamping device (clamp spring) closed and the ribbon cut to the appropriate length.
Figure 4A:
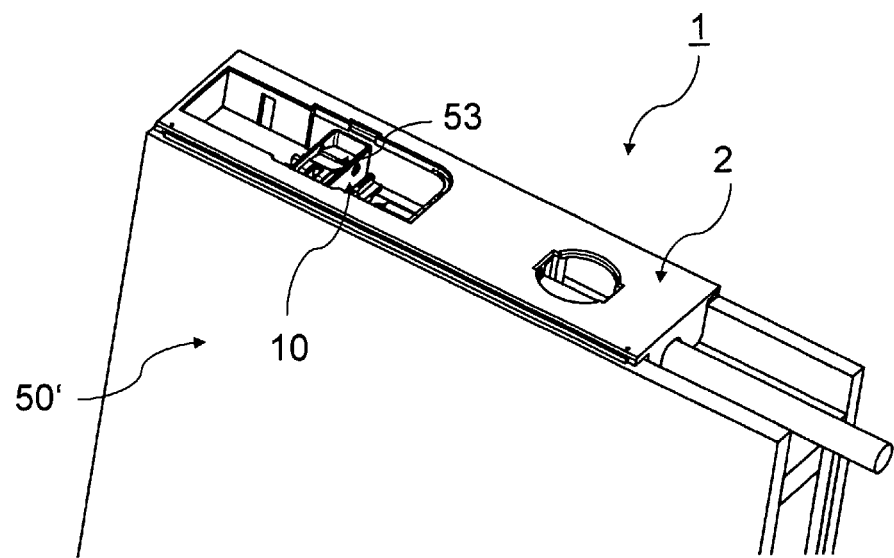
FIG. 4a shows the connecting device with the clamping device (clamp spring) closed and the ribbon cut to the appropriate length and folded over.

FIG. 3b illustrates ribbon 51 with the clamping device, which is formed b a clamp spring 10, closed and the ribbon cut to the right length 52. Finally, FIG. 4a shows retaining device 2 of connecting device 1 with the clamping device 10 closed and the ribbon cut to the right length and folded over 53.

Figure 4B:
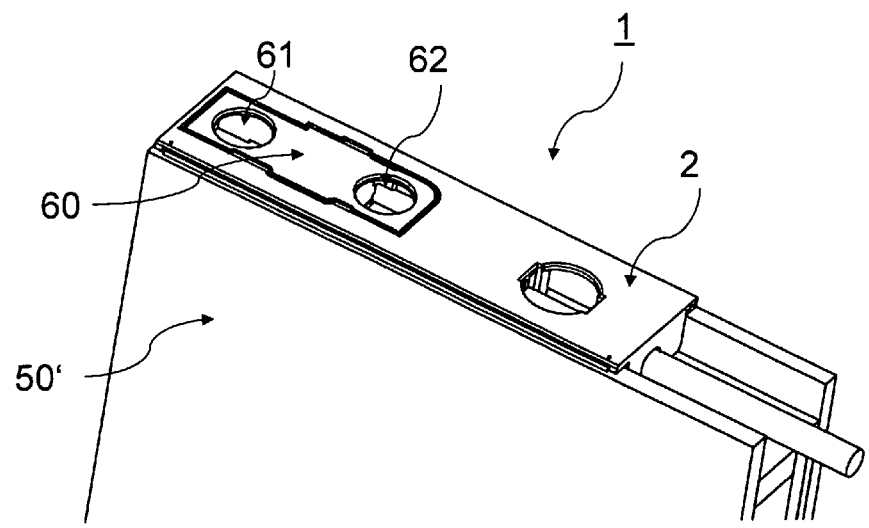
FIG. 4b shows the connecting device with the cover box closed.

In FIG. 4b, retaining device 2 of connecting device 1 can be seen with a covering element 60 closed, into which a sealant compound, not illustrated in FIG. 4b, may be filled through filling openings 61 and 62, respectively. Connecting device 1 thus contacted with photovoltaic-capable insulating glass 50 may now be connected to further insulating glass panes and/ or to AC power converters.

Figure 5:
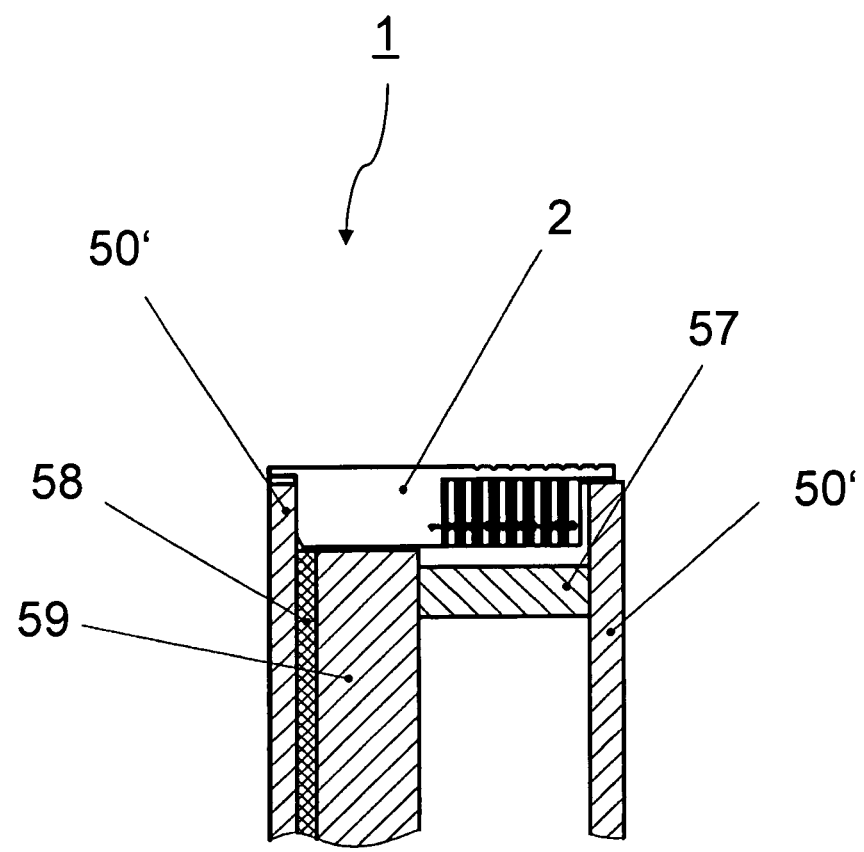
FIG. 5 illustrates the connecting device in a sectional view.

FIG. 5 illustrates retaining device 2 of connecting device 1 in a sectional view. Also shown in FIG. 5 are rear glass pane 59 and polyvinyl butyral foil/photovoltaic layer 58. Here, the photovoltaic-capable layer has been applied to rear glass pane 59, for example by deposition methods. The polyvinyl butyral foil herein provides the function of protecting the photovoltaic-capable layer from the environment, for example from mechanical stress. But it also serves for purposes of electrical insulation and has a barrier function with respect to oxygen and water vapor. Spacer 57 provides for pressing the photovoltaic module to the insulating glass pane 50'.

A particular embodiment, or a method for installing the connecting device, will now be described in more detail.

According to the invention, a connecting device is provided which enables a photovoltaic-capable insulating glass to be contacted. Particularly important is that the installation is accomplished quickly and easily. To this end, the connection system is inserted into the lateral profile of the pane and the ribbon is clamped. (The clamping of the ribbon is also described in DE 10 2007 006 433 A1, which document is fully incorporated into the subject matter of the present application with respect to the clamping of the ribbon).

A solar conductor is connected to the clamping device by a crimp connection. When installed at the lateral side, the connection is completely encapsulated with a sealing compound which first and foremost is to protect the interior of the pane from moisture and in this context also protects the contact area. Since insulating glass is manufactured in various thicknesses, the housing of the connecting device is designed to be variable. In this case, it is cut to the desired size.

However, the variability may also be achieved by additional components. When completed, there are only two conductors with connectors visible at the lateral side of the pane, which permit to connect the pane with other panes or with an inverter.

It will be apparent to those skilled in the art that the invention is not limited to the exemplary embodiments described above but may be varied in various ways. For example, the connecting device may comprise a plurality of contact clamps for connecting a plurality of ribbons in a junction box. In particular, the invention may also be applied in other solar modules.

Furthermore, it will be apparent that the features, whether disclosed in the specification, in the claims, the figures or otherwise, individually define essential elements of the invention, even if they are described in combination with other features.

What is claimed is:

1. A connecting device for photovoltaic-capable double-pane insulating glass that comprises a pair of insulating glass panes and an intermediate space between said pair of insulating glass panes, the connecting device comprising:
    at least one holding device laterally attachable to the photovoltaic-capable insulating glass;
    wherein said holding device has
    (i) an elongated shape extending in a first direction, a second direction and a third direction, the dimensions of the holding device being in the first direction a length, in the second direction a width and in the third direction a height, the length of the holding device being larger than both the width and the height,
    (ii) a planar tog side spanned by the first direction and second direction, and
    (iii) a bottom side which, in an installed state of the holding device, is open to the intermediate s ace to enable at least one flat-ribbon cable being inserted into a clamping device arranged in the holding device;
    wherein the width of the holding device is constant along the first direction, so that the holding device is insertable between the pair of insulating glass panes;
    wherein said at least one flat-ribbon cable serves to establish an electrical contact for a photovoltaic device accommodated in the intermediate space; and
    wherein said clamping device is provided with an electrical supply line such that the clamping device establishes an electrical clamping contact between the at least one flat-ribbon cable and the electrical supply line.

2. The device as claimed in claim 1, wherein the width of the holding device of the connecting device is adaptable to the width of the at least one intermediate space between the at least two insulating glass panes by means of severable elements.

3. The device as claimed in claim 1, wherein the holding device of the connecting device has a collar engaged in the intermediate space, which has a width adaptable to the width of the intermediate space.

4. The device as claimed in claim 1, wherein the clamping device is formed by a clamp spring, 5. The device as claimed in claim 1, wherein the holding device of the connecting device is adapted to accommodate a sealing compound.

6. The connecting device for photovoltaic-capable double-pane insulating glass as claimed in claim 1, wherein the holding device is adapted to
- be attached on or to the at least one edge of the at least two insulating glass panes;
- include at least one support for at least one clamping device;
- permit to support or guide the electrical supply line;
- allow to pass the flat-ribbon cable through the holding device or through the holding device and the clamping device.

7. A photovoltaic-capable double-pane insulating glass, comprising a pair of insulating glass panes and an intermediate space between said pair of insulating glass panes, with at least one flat-ribbon cable that protrudes from the intermediate space between the at least two insulating glass panes, and at least one connecting device as claimed in claim 1, which is mounted to the photovoltaic-capable insulating glass by being inserted between the pair of insulating glass panes of the photovoltaic-capable insulating glass.

8. The photovoltaic-capable insulating glass as claimed in claim 7, wherein said at least one flat-ribbon cable protrudes from the at least one intermediate space between the at least two insulating glass panes.

9. A method for connecting a connecting device to a photovoltaic-capable double-pane insulating glass which comprises a pair of insulating glass panes and an intermediate space between said pair of insulating glass panes, the method comprising:
- providing a photovoltaic-capable insulating glass that has at least one fist ribbon cable;
- connecting at least one electrical supply line with at least one clamping device;
- providing a holding device which accommodates or supports the at least one electrical clamping device or the at least one electrical clamping device and the at least one electrical supply line for establishing a clamping contact with the at least one flat-ribbon cable wherein a bottom of the holding device has an opening;
- inserting an electrical clamping device into the holding device;
- mounting the connecting device to the insulating glass panes, wherein the connecting device is placed over the flexible flat-ribbon cable and the flat-ribbon cable is passed through the clamping device, and wherein the connecting device is inserted between the pair of insulating glass panes; and
- applying a force to the clamping device such that the clamping device establishes an electrical contact between the flat-ribbon cable and the electrical supply line.

10. The method for connecting a connecting device to a photovoltaic-capable double-pane insulating glass as claimed in claim 9, wherein the connecting device is adapted to the width of the at least one intermediate space between the at least: two insulating glass panes by means of severable strips.

11. The method for connecting a connecting device to a photovoltaic-capable double-pane insulating glass as claimed in claim 9, wherein the ribbon cable is cut to a predetermined length.

12. The method for connecting a connecting device to a photovoltaic-capable double-pane insulating glass as claimed in claim 9, wherein the flat-ribbon cable is folded over.

13. The method for connecting a connecting device to a photovoltaic-capable double-pane insulating glass as claimed in claim 9, wherein the connecting device is closed by a covering element or filled with a sealing compound.

* * * * *